US012734449B2

(12) United States Patent
Cockram

(10) Patent No.: US 12,734,449 B2
(45) Date of Patent: Sep. 15, 2026

(54) GENERATING COMPOUND COLLIDERS

(71) Applicant: Sony Interactive Entertainment Inc., Tokyo (JP)

(72) Inventor: Philip Cockram, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 171 days.

(21) Appl. No.: 18/908,916

(22) Filed: Oct. 8, 2024

(65) Prior Publication Data

US 2025/0128162 A1 Apr. 24, 2025

(30) Foreign Application Priority Data

Oct. 20, 2023 (GB) ..................................... 2316062

(51) Int. Cl.

| | |
|---|---|
| ***A63F 13/577*** | (2014.01) |
| ***A63F 13/52*** | (2014.01) |
| ***A63F 13/54*** | (2014.01) |
| ***A63F 13/56*** | (2014.01) |
| ***A63F 13/57*** | (2014.01) |
| ***G06T 13/40*** | (2011.01) |
| ***G06T 17/00*** | (2006.01) |
| *A63F 13/63* | (2014.01) |

(Continued)

(52) U.S. Cl.

CPC ............ *A63F 13/577* (2014.09); *A63F 13/52* (2014.09); *A63F 13/54* (2014.09); *A63F 13/56* (2014.09); *A63F 13/57* (2014.09); *G06T 13/40* (2013.01); *G06T 17/00* (2013.01); *A63F 13/63* (2014.09); *A63F 13/79* (2014.09); *G06T 17/205* (2013.01); *G06T 2207/30196* (2013.01)

(58) Field of Classification Search

CPC .......... A63F 13/52; A63F 13/56; A63F 13/54; A63F 13/57; A63F 13/577; A63F 13/63; A63F 13/79; A63F 2300/5553; A63F 2300/6607; A63F 2300/8082; G06T 13/40; G06T 17/00; G06T 17/205; G06T 2207/30196

See application file for complete search history.

(56) References Cited

U.S. PATENT DOCUMENTS

| | | | | |
|---|---|---|---|---|
| 10,282,885 | B2 * | 5/2019 | Angelidis | G06T 17/005 |
| 10,431,000 | B2 * | 10/2019 | Zhang | G06T 17/205 |
| 10,672,190 | B2 * | 6/2020 | McBeth | G06T 19/20 |

(Continued)

OTHER PUBLICATIONS

Combined Search and Examination Report for corresponding GB Application No. 2316062.5, 5 pages, dated Apr. 3, 2024.

(Continued)

*Primary Examiner* — William H Mcculloch, Jr.
(74) *Attorney, Agent, or Firm* — Fish & Richardson P.C.

(57) ABSTRACT

A method of generating a compound collider for a given object, the method comprising the steps of: receiving a mesh of the given object, the mesh comprising at least one concave portion; and generating a compound collider representative of at least the concave portion of the mesh, in which the step of generating comprises: inputting the mesh to a machine learning model trained to generate a respective compound collider based on an input mesh comprising at least one concave portion, and using the trained machine learning model to generate the compound collider representative of at least the concave portion of the mesh.

20 Claims, 2 Drawing Sheets

(51) Int. Cl.
*A63F 13/79* (2014.01)
*G06T 17/20* (2006.01)

(56) References Cited

U.S. PATENT DOCUMENTS

| | | | | |
|---|---|---|---|---|
| 11,508,167 | B2 * | 11/2022 | Deng | G06V 10/82 |
| 11,941,739 | B1 * | 3/2024 | Radzihovsky | G06T 17/205 |
| 11,978,268 | B2 * | 5/2024 | Deng | G06N 3/0455 |
| 12,175,368 | B2 * | 12/2024 | Teig | G06N 3/047 |
| 12,450,812 | B2 * | 10/2025 | Wei | G06T 13/60 |
| 12,572,219 | B1 * | 3/2026 | Voros | G06F 3/017 |
| 2015/0325030 | A1 * | 11/2015 | Witkin | G06T 13/40 345/473 |
| 2018/0189999 | A1 * | 7/2018 | Angelidis | G06T 15/20 |
| 2019/0026942 | A1 * | 1/2019 | Zhang | G06T 15/205 |
| 2019/0108681 | A1 * | 4/2019 | Mcbeth | G06T 19/006 |
| 2021/0319209 | A1 * | 10/2021 | Deng | G06N 3/084 |
| 2023/0078756 | A1 * | 3/2023 | Deng | G06T 17/00 382/103 |
| 2023/0290032 | A1 * | 9/2023 | Wei | G06T 13/60 |
| 2024/0009560 | A1 * | 1/2024 | Liu | G06T 17/20 |
| 2025/0061639 | A1 * | 2/2025 | Sanocki | G06T 19/006 |
| 2025/0095261 | A1 * | 3/2025 | Molla | A63F 13/56 |
| 2025/0128162 | A1 * | 4/2025 | Cockram | G06T 13/40 |
| 2025/0278880 | A1 * | 9/2025 | Green | G06T 13/20 |
| 2025/0299444 | A1 * | 9/2025 | Ye | G06T 19/20 |
| 2025/0308148 | A1 * | 10/2025 | Joudrey | G06T 13/80 |
| 2025/0371786 | A1 * | 12/2025 | Troy | A63F 13/52 |

OTHER PUBLICATIONS

Extended European Search Report for corresponding EP Application No. 24204445.1, 8 pages, dated Feb. 28, 2025.

Zhiqin Chen et al: "BSP-Net: Generating Compact Meshes via Binary Space Partitioning", arxiv.org, Cornell University Library, 201 Olin Library Cornell University Ithaca, NY 14853, 10 pages, dated Dec. 7, 2020.

Boyang Deng et al: "CvxNet: Learnable Convex Decomposition", arxiv.org, Cornell University Library, 201 Olin Library Cornell University Ithaca, NY 14853, 14 pages, dated Sep. 12, 2019.

Anonymous: "How to make a custom collider that will deform with a skeleton in Godot—Stack Overflow",,Aug. 27, 2021 (Aug. 27, 2021), pp. 1-2, XP093251342,Retrieved from the Internet: URL:https://stackoverflow.com/questions/68868990/how-to-make-a-custom-collider-that-will-deform-with-a-skeleton-in-godot, 2 pages, Aug. 20, 2021.

* cited by examiner

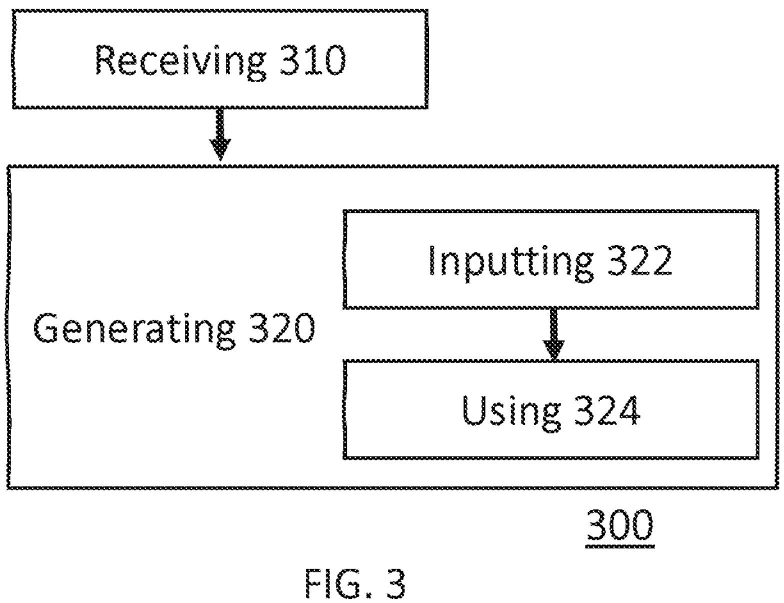
FIG. 3
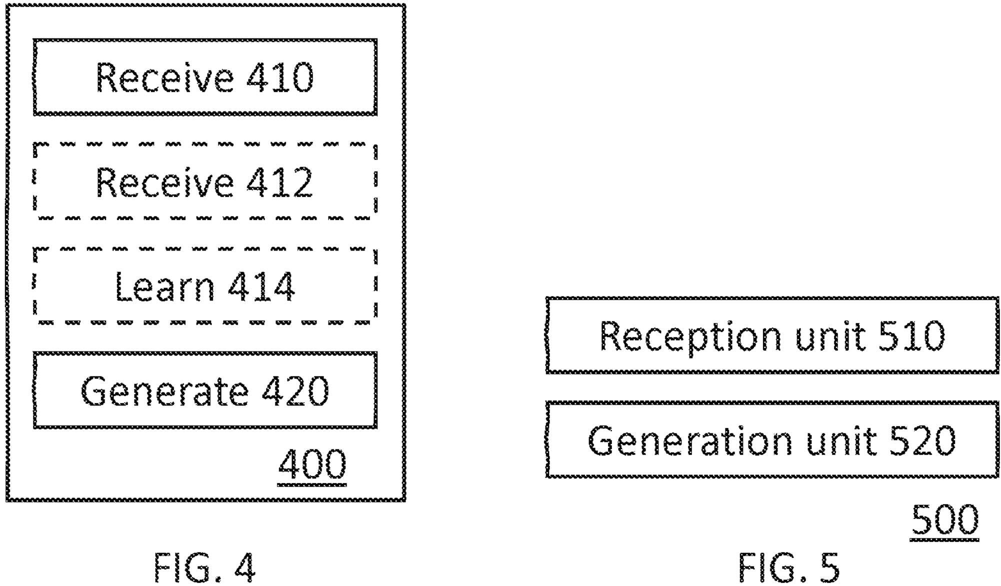
FIG. 4
FIG. 5

GENERATING COMPOUND COLLIDERS

FIELD OF INVENTION

The present invention relates to methods and devices for generating compound colliders.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In virtual environments, colliders are used for calculating collisions of virtual objects. For example, colliders ensure that "solid" virtual objects do not behave in a physically unrealistic manner (such as by preventing solid objects from moving through each other). In general, colliders are invisible low polygon-count meshes that are associated with the visible skin of a virtual object. Colliders may also be used to define boundaries in a virtual environment. These boundaries may be used to prevent some or all virtual objects from passing through them. The boundaries may be fully or partially associated with a visible boundary such as a wall or roadblock (which may, for example, be associated with an invisible wall that blocks the passage of vehicles in the virtual environment) respectively.

It is highly preferable for colliders of virtual objects to be convex in nature, since a concave collider will generally require significantly more computational resources to calculate resulting collisions of such a collider in real-time.

As an example, when two colliders are convex, it is always possible to calculate whether the two colliders are spatially separated from each other (i.e. that they do not intersect) by evaluating a limited set of 2-dimensional planes defined from vertices of each of the two colliders. If a plane in the limited set exists where the vertices from one of the colliders lie on one side of the plane (or on the plane itself) and the vertices from the other one of the colliders lie on the other side of the plane (or on the plane itself), the plane is a separating plane and the two colliders are determined not to intersect one another (i.e. they are disjoint). This technique uses the concept known as hyperplane separation theorem. Although it will be appreciated that other computationally efficient techniques for calculating collisions between convex colliders are available, and may alternatively or additionally be used.

It will be appreciated that in the above example, if one of the colliders is concave, the two colliders may be positioned so that they do not intersect one another (i.e. they are disjoint) but have no separating plane in the limited set. For example, a convex collider may be positioned so that it is enveloped by (but not intersecting) the concave region of the concave collider. In this case, if the technique described in the above paragraph were used, it would result in an erroneous detection of the two colliders intersecting. Therefore, the above-described technique could not be used if one of the colliders is concave, and a different technique that is suitable for concave collision detection would have to be used. However, such techniques have a computational cost that is several orders of magnitudes higher than techniques that may be used if all the colliders are convex.

It is in this context that the present disclosure arises.

SUMMARY OF THE INVENTION

In a first aspect, a method of generating a compound collider for a given object is provided in claim 1.

In another aspect, a machine learning model for generating a compound collider is provided in claim 7.

In another aspect, a processing device is provided in claim 15.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 schematically illustrates an method;

FIG. 4 schematically illustrates an example machine learning model; and

FIG. 5 schematically illustrates an example processing device.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
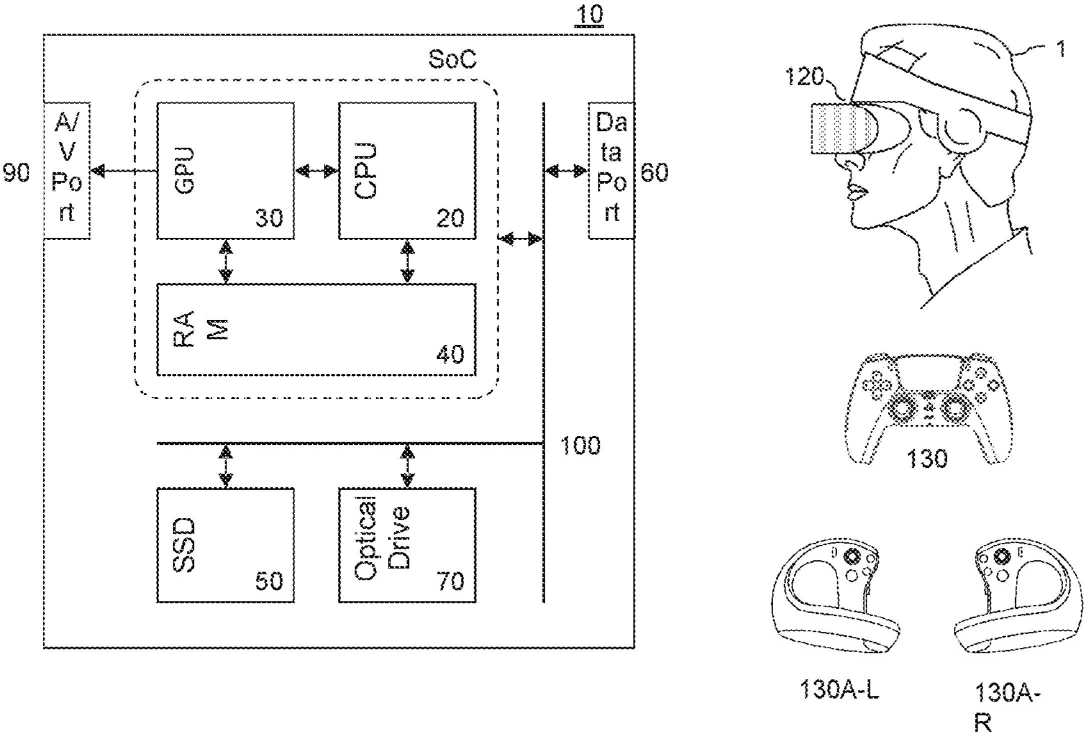
FIG. 1 schematically illustrates an example entertainment system.

Referring now to the drawings, wherein like reference numerals designate identical or corresponding parts throughout the several views, FIG. 1 shows an example of an entertainment system 10 as a computer or console.

The entertainment system 10 comprises a central processor or CPU 20. The entertainment system also comprises a graphical processing unit or GPU 30, and RAM 40. Two or more of the CPU, GPU, and RAM may be integrated as a system on a chip (SoC). Further storage may be provided by a disk 50, either as an external or internal hard drive, or as an external solid state drive, or an internal solid state drive.

The entertainment device may transmit or receive data via one or more data ports 60, such as a USB port, Ethernet® port, Wi-Fi® port, Bluetooth® port or similar, as appropriate. It may also optionally receive data via an optical drive 70. Audio/visual outputs from the entertainment device are typically provided through one or more A/V ports 90 or one or more of the data ports 60.

Where components are not integrated, they may be connected as appropriate either by a dedicated data link or via a bus 100.

An example of a device for displaying images output by the entertainment system is a head mounted display 'HMD' 120, worn by a user 1. Interaction with the system is typically provided using one or more handheld controllers 130, and/or one or more VR controllers (130A-L,R) in the case of the HMD.

As previously noted, it is highly preferable for colliders of virtual objects to be convex in nature, since a concave collider will generally require significantly more computational resources to calculate resulting collisions in real-time.

However, it will be appreciated that many objects are not concave in shape, and it is desirable to include these objects in virtual environments. Meanwhile, it is also desirable to be able to use the efficient collision detection methods that can only be used with convex colliders.

One option is to use a convex collider that covers the entire concave object as well as regions that are not part of the concave object. However, in these cases, the concave regions of the object will be "filled" so that a collision will be detected when another object intersects these filled regions, even though the other object would not actually be intersecting the concave object itself. Therefore, in these cases, concave objects may appear to behave unexpectedly or unrealistically to users of the virtual environment by colliding with objects that they don't appear to touch.

Figures 2A, 2B, 2C:
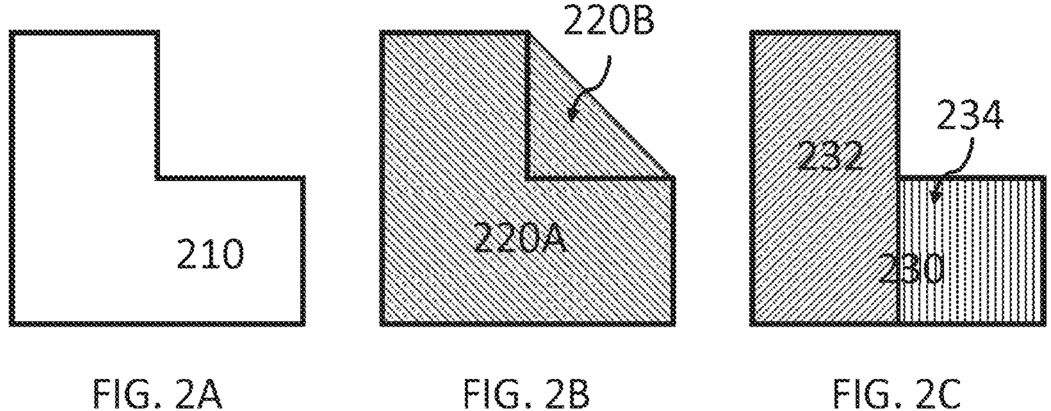
FIGS. 2A, 2B and 2C schematically illustrate example colliders for an object.

For example, FIG. 2A illustrates an example "L"-shaped concave object 210. It will be appreciated that, while FIGS. 2A, 2B and 2C illustrate 2-dimensional objects for ease of drawing, the techniques described herein may be also applied to 3-dimensional objects.

FIG. 2B illustrates the same concave object 210 and a convex collider 220 (indicated by the shaded area 220A,B) that covers the entire concave object 210. The "filled" region referred to above corresponds to the portion 220B of the convex collider that is outside of the concave object 210.

Therefore, in order to be able to use the efficient collision detection methods with a concave object (i.e. an object comprising at least one concave portion) and more accurately simulate collisions of the concave object, a developer or designer of a virtual environment will create a compound collider of the concave object. A compound collider of a concave object is a group of convex colliders that, together, represent or more closely approximate the shape of the concave object.

For example, FIG. 2C illustrates the same concave object 210 as FIGS. 2A and 2*b*. In this illustrated example, a compound collider 230 may be created for the concave object 210. The compound collider 230 comprises two convex colliders 232, 234 (each of which is shaded with a different pattern in FIG. 2C). It will be appreciated that other configurations of two or more convex colliders may be used to represent or approximate the shape 210.

Therefore, when performing collision detection for the concave object 210, convex collision detection techniques may be used, where each of the two convex colliders 232, 234 is individually processed for the collision detection. Therefore, by using compound colliders, concave objects and their collisions may be more accurately represented whilst still enabling efficient convex collision detection techniques to be used.

However, compound colliders were previously, as noted above, created by hand by a developer or designer of a virtual environment, which is a tedious and time-consuming process that requires a significant amount of practice in order to be able to create efficient compound colliders.

Whilst it is possible to accurately approximate any concave shape with a large number of complex (i.e. many-sided) convex colliders, the computational cost of calculating collisions for a given object will scale proportionately with the number of convex colliders used, and the complexity of those convex colliders, for the given object.

Therefore, it is desirable to provide techniques that may advantageously improve the process for generating compound colliders.

Accordingly, turning now to FIG. 3, a method 300 of generating a compound collider for a given object is provided in accordance with embodiments of the present disclosure.

The method 300 comprises a step of receiving 310 a mesh of the given object. The mesh comprises at least one concave portion.

For example, the mesh may be a texture mesh of the given object, where a texture mesh is a mesh to which a texture (such as an image texture) is applied for the given object. As another example, the mesh may be a concave collider (i.e. a collider mesh comprising at least one concave portion.

The mesh may be selected or provided by a user for example. Alternatively, or in addition, a user may provide an indication of the given object and, in response to the indication, a mesh associated with the given object may be retrieved from a storage device or downloaded via a network (such as the internet).

The method also comprises a step of generating 320 a compound collider of at least the concave portion of the mesh. As previously noted a compound collider may be a group of two or more convex colliders that, together, represent or approximate the shape of at least the concave portion of the mesh of the given object.

The step of generating 320 comprises a step of inputting 322 the mesh to a machine learning model (which is discussed in more detail elsewhere herein) trained to generate a respective compound collider based on an input mesh comprising at least one concave portion.

For example, the machine learning model may be trained to perform a convex decomposition of the input mesh. A convex decomposition of a concave mesh is a decomposition of the concave mesh into two or more convex meshes, which in this case are convex colliders.

It should be noted that throughout the description the terms "convex decomposition" and "compound collider" may sometimes be used interchangeably. It will be appreciated that a convex decomposition is a compound collider. However, not all compound colliders are solely convex decompositions. This similar to how all squares are rectangles but not all rectangles are squares.

In particular, a compound collider may comprise additional elements separate to a convex decomposition, such as a bounding volume hierarchy (BVH) of the respective convex colliders in the convex decomposition. As another example, a compound collider may comprise information associating at least one of the convex colliders with a bone of a bone hierarchy of the corresponding object (the details of which are discussed in more detail elsewhere herein).

The step of generating 320 also comprises a step of using 324 the trained machine learning model to generate the compound collider representative of at least the concave portion of the mesh.

Turning now to FIG. 4, a machine learning model 400 for generating a compound collider is provided in accordance with embodiments of the present disclosure.

The machine learning model 400 is trained to receive 410 an input mesh comprising at least one concave portion, and is trained to generate 420 a compound collider based on the input mesh.

For example, in some cases, the machine learning model may be trained using one or more example convex decompositions/compound colliders of a corresponding one or more concave meshes. The one or more example convex decompositions/compound colliders may be convex decompositions/compound colliders previously created by developers and/or designers of virtual environments.

In some embodiments of the present disclosure, a generative adversarial network (GAN) may be utilised in which a generative network is trained to generate a compound collider based on an input mesh comprising at least one concave portion.

The generative network may be trained so the generated compound colliders produce a desired result when they are evaluated by a discriminative network that is trained to evaluate a suitability of compound colliders.

The discriminative network may be trained using a database of compound colliders and their corresponding meshes. In some cases, the database may additionally comprise a plurality of versions of a compound collider for a given object, where each version comprises two or more convex colliders different to, or in different positions in comparison to, the other versions of the compound collider for the given object. Therefore, it will be appreciated that the database may comprise different colliders for different objects, different colliders for the same object, or any combination of the two.

Each compound collider in the database may comprise two or more convex colliders where the size, shape and or position of each of the convex colliders within the compound collider, or the overall configuration of a compound collider, may, for example, be classified as "suitable" or "not-suitable". Other classifications for each of the compound colliders in the database may also, or alternatively, be used such as a suitability score, where a compound collider is classified by a numerical value that represents the suitability of the compound collider for use within a virtual environment.

A suitability score (or rating) may be defined in a number of ways, as appropriate for a particular implementation. For example, a suitability score (or rating) can be determined in dependence upon a computational efficiency when using a respective compound collider to calculate collisions and/or how well the respective compound collider reflects the shape of its corresponding object. In some cases, the suitability of a compound collider may vary in dependence upon a particular application for the compound collider.

For example, for some types of objects it may be advantageous for compound colliders to be optimised for computational efficiency when calculating collisions using the compound collider—at the cost of the compound collider less accurately representing the shape of its corresponding object. This may be appropriate for types of objects that require less detail or are used in large quantities in the virtual environment.

Alternatively, for other types of objects it may be advantageous for compound colliders to be optimised for accurately representing the shape of their corresponding object—at the cost of computational efficiency when calculating collisions using the compound collider. This may be appropriate for types of objects that require more detail or are used sparingly in the virtual environment—such as a user's avatar. Since a user typically only controls a single avatar, and their avatar will frequently be visible when interacting with the virtual environment, it may be more advantageous to use a more complex compound collider even though it may reduce computational efficiency because a user will be more likely to notice clipping issues with collisions.

Therefore, in some embodiments of the present disclosure, the machine learning model may be trained to generate compound colliders for a given category of object. For example, suitable categories of objects may include: user avatars; interactable objects; equippable items; small objects; large objects; scene boundaries; static scene objects (e.g. large furniture, walls); non-player characters (NPCs), which may be further categorised based on a general shape of NPC (e.g. humanoid or biped, animal or quadruped, monster, robot, etc.); etc.

It will be appreciated that the classification of the suitability of a respective compound collider in the database may be variable in dependence upon the intended use of compound collider that the GAN is to be trained for.

For example, more complex compound colliders may be classified as "suitable" when a GAN is trained to generate compound colliders intended for a user's avatar, whilst being classified as "unsuitable" when a GAN is trained to generate compound colliders intended for background (e.g. non-interactable) objects in a virtual environment. This is because each of these types of objects has different requirements for a compound collider due to their respective prominence/importance and/or frequency/quantity in a virtual environment.

Of course, the suitability score could be derived based upon consideration of a number of different parameters rather than only those parameters described above. In the example of using a GAN, the discriminator may be trained without any explicit knowledge of which features are considered to be indicative of particular suitability for a given application—in such a case, an existing dataset may be provided that indicates what compound colliders would be suitable and what compound colliders would be unsuitable. From this, the discriminator could be trained to derive which parameters are indicative of suitability and therefore determine the suitability of the compound colliders generated by the generator.

Alternatively, or in addition, a reinforcement learning model may be used in which a reward is determined based upon one or more characteristics of a compound collider. These characteristics can be selected in any suitable way; for instance, the number of convex colliders comprised by a compound collider, the (or average) complexity of the convex colliders in the compound collider, how closely the compound collider matches the shape of its corresponding object, the performance of the compound collider in collision detection calculations (which may be determined by testing a compound collider in one or more predefined collisions or by performing a Monte Carlo simulation of the compound collider in one more collisions), and the like.

For example, in a training phase of the reinforcement learning model, a reward function may provide rewards when the generated compound colliders have similar characteristics compared to one or more preselected compound colliders. For example, one of the characteristics to be compared may be the performance of the compound collider in collision detection calculations.

The training of models may be performed with any desired level of granularity in respect of the intended usage. For example, in some cases a model may be trained that is intended to be used to generate compound colliders for objects in a specific game, while in other cases the model may be trained so as to instead be used for generating compound colliders for objects for a series of games or an entire genre. Similarly, a model could be trained for a more specific purpose, such as for objects of a particular type or objects having a particular function.

Optionally, each of the one or more compound colliders and associated objects that may be used as training inputs to the machine learning model may be associated with one or more tags. These tags can be used to characterise the input data set so as to increase the efficiency and/or effectiveness of the training process. These tags can be used to describe features of the objects such as a categorisation of the objects themselves (such as interactable/non-interactable), the source of the object and associated compound collider (e.g., the creator of the compound collider), etc. These tags can in some cases be used to identify one or more characteristics that may not be derivable from the objects/compound colliders themselves, or would not necessarily be easy to derive.

Alternatively, or in addition, one or more tags may describe specific types of objects such as "tree", "building", "NPC", "equippable", "castle", etc.

As noted elsewhere herein, the compound colliders and objects used during training may come from a different application to the current one; for example, some generic compound colliders and objects may be provided for training to enable 'out of the box' functionality. For a developer, compound colliders and objects may be accessible from a library associated with a graphics engine, and may be supplied with that engine and/or may come from previous projects used by the developer, including for example earlier games/applications in a series. Using earlier games in a series may enable the system to learn optimised compound collider generation for a specific look and feel of the series. The system can also learn from compound colliders created for the current game application, whether designed by hand or already generated using the system (e.g. after developer approval/adjustment), so that the training may be iterative as the game/application grows. This may be helpful when developing a new game/application with distinctive objects, or to speed up development. A system trained on the current game/application may also be of help when developing expansions and modifications, and so a system trained in this way may be provided as part of a so-called 'modding tool' for end users.

While the above discussion has focused upon the use of a single trained model for generating compound colliders for objects, in some embodiments it may be considered advantageous to use a plurality of trained models for generating compound colliders for objects. For instance, a first model may be used to generate compound colliders for objects that make up large-scale features of an environment (such as the trees within woodland, and the buildings within a city), while a second model may be used to generate compound colliders for small-scale features of the environment (such as objects that can be interacted with by a user of the virtual environment).

This can be advantageous in that the use of two separate models can enable a more specific training for specific types of objects, which can improve the generated compound colliders. Of course, more than two models could be used in a particular implementation—for instance, a third model could be used to generate compound colliders for NPCs.

Whilst specific examples for the type of machine learning model have been given above, the machine learning model is not limited to these examples and any other appropriate type of machine learning model may be used.

Optionally, as indicated by the dotted outline in FIG. 4, in some embodiments of the present disclosure, the machine learning model 400 may be trained to receive 412 an input representative of a bone hierarchy corresponding to the input mesh.

A bone hierarchy is set of interconnected bones, where each bone is associated with a respective portion of the corresponding mesh and may be connected to one or more other bones via respective joints. The bones are used for processing animations of the corresponding object. It will be appreciated by those skilled in the art that, although the term "bone" is used, the bones do not need to correspond to an anatomical feature, and objects that do not contain anatomical bones may still be associated with a bone hierarchy comprising one or more bones. For example, a virtual representation of an exemplary object of a wall comprising a hinged door may include a bone hierarchy comprising at a bone associated with the door, and another bone associated with the remaining portion of the wall. In this example, the two bones may be connected by a joint at the location of the hinge. Therefore, the virtual door may be moved in a similar manner to the door it is intended to represent by rotating the bone associated with the door around the joint.

In these embodiments, the machine learning model 400 may be trained to learn 414 a correspondence between the input mesh and the input representative of the bone hierarchy. The training dataset described elsewhere herein may therefore comprise respective bone hierarchies associated with correspond objects/compound colliders.

In these embodiments, the machine learning model 400 may be trained to generate 420 the compound collider in dependence upon the learned correspondence. The generated compound collider being able to move with the input bone hierarchy.

As an example, the compound colliders for two identical meshes associated with different bone hierarchies may be different to one another in the sense of the individual convex colliders that form the compound colliders. This is because the way in which an associated object may move, as well as the object's mesh, may affect the requirements for the object's compound collider. The way in which an object can move is encoded by the bone hierarchy in this case.

Therefore, the machine leaning model 400 may be trained to generate compound colliders being able to move with the input bone hierarchy by learning a correspondence between an input mesh and an input representative of the bone hierarchy.

As an example, the machine learning model 400 may learn how the mesh deforms or changes shape in dependence to upon different configurations of a given bone hierarchy (i.e. the different ways the bones in the bone hierarchy may be validly positioned), and may learn to generate a compound collider that is suitable for or able to move with these valid deformations or shape changes of the mesh.

Optionally, in these embodiments of the present disclosure, the machine learning model 400 may be trained to generate the compound collider being able to move with the input bone hierarchy by associating at least one respective convex collider of the compound collider with a respective bone of the input bone hierarchy.

For example, the machine learning model 400 may be trained to associate a respective convex collider with a respective bone of the input bone hierarchy after generating the respective convex collider for the compound collider.

Therefore, a respective convex collider of the compound collider generated by the machine learning model may move with the bone of the bone hierarchy that the respective convex collider is associated with.

Alternatively, or in addition, in some embodiments of the present disclosure, the information representative of the bone hierarchy includes information representative a range of motion of respective joints comprised by the bone hierarchy. In these embodiments, the machine learning model may, for example, learn how the mesh deforms or changes shape in dependence upon the range of motion of respective joints of a given bone hierarchy, and may learn to generate a compound collider that is suitable for or able to move with these valid deformations or shape changes of the mesh.

Alternatively, or in addition, in some embodiments of the present disclosure, the machine learning model 400 may generate the compound collider in dependence upon the learned correspondence by generating the plurality of convex colliders forming the compound collider in an order based on the hierarchical structure of the input bone hierarchy.

For example, the machine learning model 400 may generate a convex collider corresponding to a parent or root bone of the bone hierarchy before generating a convex collider corresponding to a branch or child bone of the bone hierarchy. This may be advantageous because movement of the parent or root bone may also move the branch or child bone, whilst movement of the branch or child bone may occur independently of the parent or root bone. Therefore, movements of the convex collider associated with the parent or root bone will influence the movement convex colliders associated with child or branch bones of the parent or root bone.

It will be appreciated that any given bone may be associated with a parent or root bone and/or one or more child or branch bones. Additionally, a bone that is a child or branch bone of another bone may also have one or more child or branch bones, which will also be (second generation) child or branch bones of the other bone.

Optionally, in some embodiments, the information representative of the bone hierarchy and/or the mesh may include information representative of one or more animations for the given object. In these embodiments, the machine learning model 400 may be trained to optimise the generated compound collider for the one or more aminations. Additionally, the training data used to train the machine learning model 400 may comprise respective one or more animations for respective objects in the training data set.

Therefore, further optionally, in these embodiments, the machine learning model 400 may be trained to generate, based on an input mesh comprising at least at least one concave portion and/or an input representative of a bone hierarchy corresponding to the input mesh, and an input representative of one or more animations for an object corresponding to the input mesh, a respective compound collider for the one or more animations for the object corresponding to the input mesh.

Returning to FIG. 3, in embodiments where the machine learning model may be trained to learn a correspondence between an input mesh comprising at least one concave portion and an input representative of a bone hierarchy corresponding to the input mesh, and trained to generate a respective compound collider being able to move with the input bone hierarchy in dependence upon the learned correspondence, the step of inputting 322 may comprise inputting information representative of a bone hierarchy of the given object to the machine learning model. In these embodiments, the step of using 322 may comprise using the trained machine learning model to generate the compound collider in dependence upon the learned correspondence. The generated compound collider being able to move with the bone hierarchy of the given object.

Further optionally, in these embodiments, the machine learning model may be trained to generate a respective compound collider being able to move with the input bone hierarchy by associating at least one respective convex collider of a respective compound collider with a respective bone of the input bone hierarchy (as described elsewhere herein). In these cases, the step of using 322 may comprise using the trained machine learning model to associate at least one respective convex collider of the generated compound collider with a respective bone of the bone hierarchy of the given object (as described elsewhere herein).

Optionally, in some embodiments of the present disclosure, the machine learning model 400 may be trained to generate a respective compound collider from a plurality of predefined convex colliders. The plurality of predefined convex colliders may comprise one or more colliders that are selected or designed by a developer.

Alternatively, or in addition, the plurality of predefined convex colliders may comprise one or more convex colliders that are known by those skilled in the art as "primitive colliders". A primitive collider is a convex collider having a basic shape. For example, in 3-dimensions, a primitive collider may be a cuboid, cylinder, sphere, etc. In 2-dimensions, a primitive may be a rectangle, circle, triangle, etc.

In these embodiments, the machine learning model 400 may be trained to generate compound colliders from only the predefined convex colliders. This may be advantageous because using only predefined colliders when generating compound colliders may result in generated compound colliders that are more efficient when performing collision calculations in comparison to compound colliders that may be generated from an unrestricted set of convex colliders.

Furthermore, if the predefined set of convex colliders consists of one or more primitive colliders (as described above), an efficiency of performing collision calculations can be further improved because primitive colliders are the convex colliders that generally have the highest efficiency for performing collision calculations.

Turning now to FIG. 5, in embodiments of the present disclosure, a processing device 500 for generating a compound collider for a given object is provided. The processing device 500 comprises a reception unit 510 configured to receive a mesh of the given object. The mesh comprising at least one concave portion. The processing device 500 also comprises a generation unit 520 configured to generate a compound collider representative of at least the concave portion of the mesh. The generation unit 520 is configured to input the mesh to a machine learning model (such as the machine learning model 400) trained to generate a respective compound collider based on an input mesh comprising at least one concave portion, and to use the trained machine learning model to generate the compound collider representative of at least the concave portion of the mesh.

The processing device, and more generally the methods and techniques herein, may include a pre-processing stage for the mesh. The machine learning model may have a predetermined number of inputs with which to receive mesh information, and so the mesh comprising at least one concave portion may be pre-processed for this input.

In a first example, the original mesh may be re-computed to have a predetermined number of polygons suitable to the predetermined number of inputs in the machine learning model. For some objects, this may simplify the mesh, whereas for others, it may make the mesh more complex (have more polygons). Optionally different machine leaning models may be trained for different predetermined numbers of polygons, so that outputs for meshes of different relative complexities can be trained separately.

Alternatively or in addition, in a second example the original mesh is split into two or more respective parts, either in an overlapping or non-overlapping manner, each having a predetermined number of polygons suitable to the predetermined number of inputs in the machine learning model. The split mesh parts may then be provided to the machine learning model (e.g. sequentially to one model and/or to parallel instances of it). The resulting output compound collider(s) from each run may then be joined together in an overlapping or non-overlapping manner as appropriate.

Alternatively or in addition, the machine learning model may be trained on meshes of different sizes, optionally within a predetermined range for a respective machine learning model, to avoid or limit the use of the above example approaches.

In any case, the mesh may optionally be input to the machine learning model in a consistent manner. For example, the mesh vertex closest to a predetermined origin may be deemed input #1, and then a neighbouring vertex is selected according to a predefined rule as input #2. Meshes are thus encoded consistently within the inputs of the machine learning model, so that the model is able to interpret the relationships between vertices in a consistent manner and, for example, learn to identify concave regions. It will be appreciated that the specific rule or rule set for navigating the vertices (or any other representation of the mesh, such as the centre-point of each polygon) is less secondary to the consistency with which it is used to translate the mesh into the machine learning model. The rule or rule set may apply to the meshes, and optionally also to the inputs of the machine learning model, for example imposing a notional triangular grid relationship between inputs so that each input has a notional location in such a grid, and this grid is then mapped to a predetermined number of polygons in a predetermined manner. A similar approach may be used to map skeletal model data.

It will also be appreciated that representations of the target and/or output compound collider(s) by the ML may use similar representation schemes to the inputs.

Modifications to the processing device 500 corresponding to the modifications described elsewhere herein will be apparent to the skilled person.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a summary embodiment of the present description, the processing device 500 may be implemented on, for example, a server (not shown) or entertainment device 10.

In a summary embodiments of the present description, a method of training a machine learning model for generating a compound collider according to the present disclosure is provided.

Instances of these summary embodiments implementing the methods and techniques described herein (for example by use of suitable software instruction) are envisaged within the scope of the application.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A computer-implemented method of generating a compound collider for a given object, the method comprising:

receiving, by one or more processors, a mesh of the given object, the mesh comprising at least one concave portion;

receiving, by the one or more processors, information representative of a bone hierarchy of the given object;

generating, by the one or more processors, a compound collider representative of the at least one concave portion of the mesh, wherein the generating comprises:

inputting the mesh and the information representative of the bone hierarchy to a machine learning model, wherein the machine learning model has been trained to learn a correspondence between an input mesh and an input representative of an input bone hierarchy to generate a respective compound collider configured to move with the input bone hierarchy; and using the trained machine learning model to generate the compound collider based on a learned correspondence between the mesh of the given object and the information representative of the bone hierarchy of the given object, the generated compound collider being configured to move with the bone hierarchy of the given object.

2. The method of claim 1, wherein the machine learning model is trained to generate the compound collider by associating at least one respective convex collider of the compound collider with a respective bone of the bone hierarchy of the given object.

3. The method of claim 1, wherein the information representative of the bone hierarchy includes information representative of a range of motion of respective joints comprised by the bone hierarchy.

4. The method of claim 1, wherein the information representative of the bone hierarchy includes information representative of one or more animations for the given object.

5. The method of claim 4, wherein the machine learning model is trained to generate, based on the mesh, the bone hierarchy, and the one or more animations, a respective compound collider optimized for the one or more animations for the given object.

6. The method of claim 1, wherein the machine learning model is configured to generate the compound collider by generating a plurality of convex colliders in an order based on a hierarchical structure of the bone hierarchy.

7. The method of claim 6, wherein the machine learning model generates a first convex collider corresponding to a root bone of the bone hierarchy before generating a second convex collider corresponding to a child bone of the root bone.

8. The method of claim 1, wherein the machine learning model is trained to generate the compound collider from a plurality of predefined convex colliders.

9. The method of claim 8, wherein the plurality of predefined convex colliders comprises a plurality of primitive colliders comprising at least one of a cuboid, a cylinder, or a sphere.

10. The method of claim 1, wherein the machine learning model is trained to generate the compound collider based on a given category of object.

11. The method of claim 10, wherein the given category of object comprises at least one of a user avatar, an interactable object, or a non-player character (NPC).

12. A system comprising:

one or more computer processors; and one or more storage devices storing instructions that, when executed by the one or more computer processors, cause the one or more computer processors to perform operations for generating a compound collider for a given object, the operations comprising:

receiving a mesh of the given object, the mesh comprising at least one concave portion;

receiving information representative of a bone hierarchy of the given object;

generating a compound collider representative of the at least one concave portion of the mesh, wherein the generating comprises:

inputting the mesh and the information representative of the bone hierarchy to a machine learning model, wherein the machine learning model has been trained to learn a correspondence between an input mesh and an input representative of an input bone hierarchy to generate a respective compound collider configured to move with the input bone hierarchy; and using the trained machine learning model to generate the compound collider based on a learned correspondence between the mesh of the given object and the information representative of the bone hierarchy of the given object, the generated compound collider being configured to move with the bone hierarchy of the given object.

13. The system of claim 12, wherein the machine learning model is trained to generate the compound collider by associating at least one respective convex collider of the compound collider with a respective bone of the bone hierarchy of the given object.

14. The system of claim 12, wherein the information representative of the bone hierarchy includes information representative of a range of motion of respective joints comprised by the bone hierarchy.

15. The system of claim 12, wherein the information representative of the bone hierarchy includes information representative of one or more animations for the given object.

16. The system of claim 15, wherein the machine learning model is trained to generate, based on the mesh, the bone hierarchy, and the one or more animations, a respective compound collider optimized for the one or more animations for the given object.

17. The system of claim 12, wherein the machine learning model is configured to generate the compound collider by generating a plurality of convex colliders in an order based on a hierarchical structure of the bone hierarchy.

18. The system of claim 17, wherein the machine learning model generates a first convex collider corresponding to a root bone of the bone hierarchy before generating a second convex collider corresponding to a child bone of the root bone.

19. The system of claim 12, wherein the machine learning model is trained to generate the compound collider from a plurality of predefined convex colliders.

20. One or more non-transitory computer-readable storage media storing instructions that, when executed by one or more computer processors, cause the one or more computer processors to perform operations for generating a compound collider for a given object, the operations comprising:

receiving a mesh of the given object, the mesh comprising at least one concave portion;

receiving information representative of a bone hierarchy of the given object;

generating a compound collider representative of the at least one concave portion of the mesh, wherein the generating comprises:

inputting the mesh and the information representative of the bone hierarchy to a machine learning model, wherein the machine learning model has been trained to learn a correspondence between an input mesh and an input representative of an input bone hierarchy to generate a respective compound collider configured to move with the input bone hierarchy; and using the trained machine learning model to generate the compound collider based on a learned correspondence between the mesh of the given object and the information representative of the bone hierarchy of the given object, the generated compound collider being configured to move with the bone hierarchy of the given object.

* * * * *